United States Patent Office 2,783,628
Patented Mar. 5, 1957

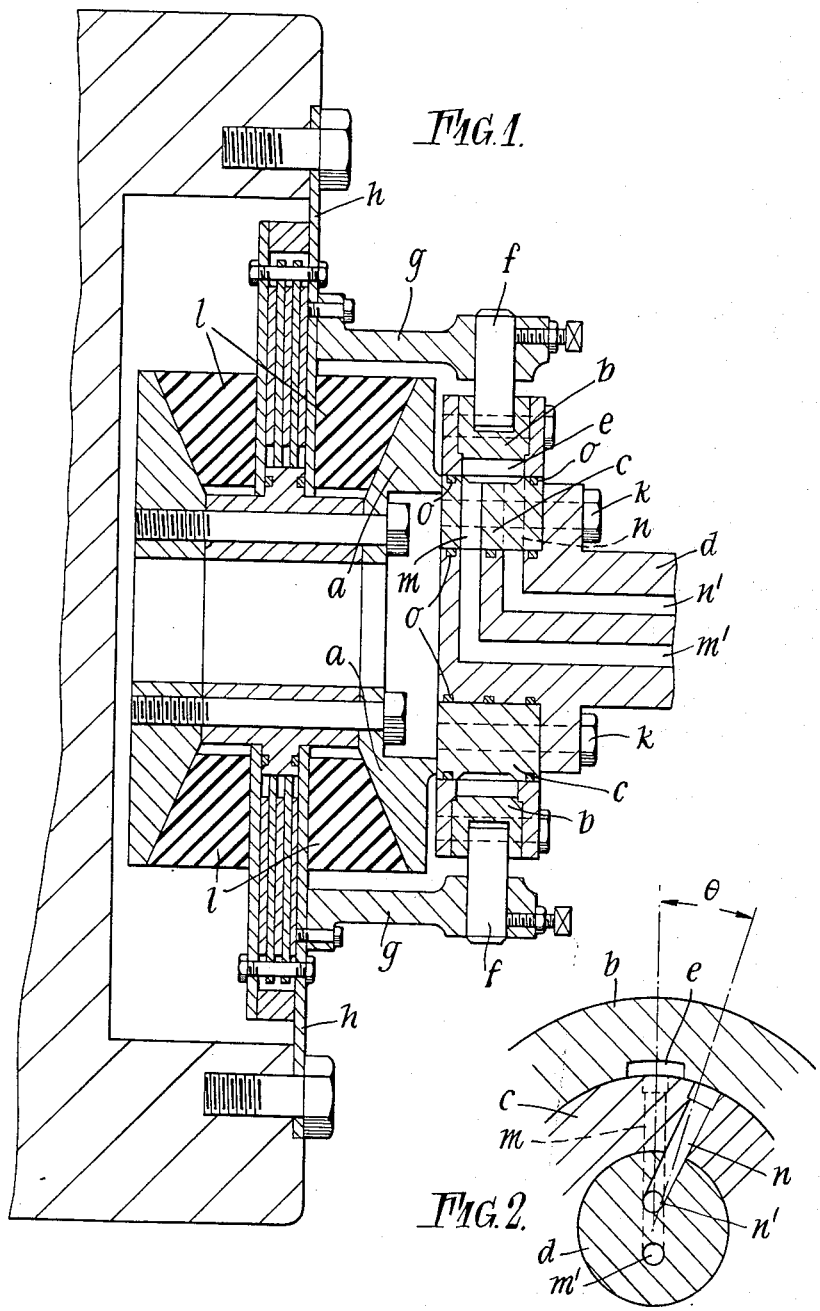

2,783,628
FLEXIBLE COUPLINGS

George Hallewell, Stamford, England, assignor to Blackstone and Company Limited, Stamford, England Application May 31, 1955, Serial No. 512,077

2 Claims. (Cl. 64—30)

This invention relates to flexible couplings of the kind which permit relative angular movement between driving and driven shafts under varying degrees of torque.

It is the object of the invention to limit the maximum torque which can be applied to such a coupling in cases where a fluid operated clutch is interposed between the prime mover and the coupling.

According to the invention at least one relief valve is arranged in the pressure supply to a fluid operated clutch, which is interposed in the drive between a prime mover and a flexible coupling connected to an output shaft, and the said valve is arranged to be opened by a predetermined angular displacement of the driving and driven members of the coupling, whereby the clutch is disengaged when a predetermined maximum torque is exceeded.

In preferred forms of the invention the valve is arranged to be closed when the torque once more falls beneath the predetermined limit so that drive is restored between the prime mover and the driven shaft.

From another aspect the invention provides a flexible coupling for the transmission of power from a prime mover to a driven shaft through a fluid operated clutch in which the coupling incorporates the complementary parts of at least one rotary slide relief valve in the fluid supply to the clutch, one part of the valve fixed to the driving member of the coupling and the other part of the valve being attached to the driven member of the coupling, whereby on the incidence of torque in excess of a predetermined maximum the relative angular movement of the parts of the coupling open the relief valve and thus disengage the fluid operated clutch.

The above and other parts of the invention are incorporated in a preferred constructional form of coupling which will now be described in some detail by way of example with reference to the accompanying drawings in which:

Fig. 1 is a diagrammatic central vertical section of the coupling,

Fig. 2 is a fragmentary transverse section showing valve ports incorporated in the coupling.

A flexible coupling of the kind permitting a degree of relative angular movement between its driving and driven members (for example a coupling as described in my application filed December 18, 1951, Serial No. 262,215) is modified to include valve means for the control of the pressure applied to a fluid operated clutch interposed in the drive between a prime mover and a driven shaft.

The driving plate $h$ of the coupling has attached to it an annular ring $b$ having two side plates enclosing one or more fluid transfer ports $e$. The attachment is achieved through brackets $g$ and pins $f$ which locate the ring $b$ axially and circumferentially.

A collar formed on the output shaft provides an anchorage for a second annular ring $c$ which fits snugly within the first mentioned ring $b$. Bolts $k$ passing through the collar and ring $c$ into the end plate $a$ of the driven part of the coupling fix the ring rigidly in position.

Sealing rings $o$ are fitted between the ring $c$ and the output shaft $d$ and between the ring $c$ and the side plates of the first mentioned ring $b$.

The second annular ring $c$ is drilled at axially and angularly spaced points to provide at least one pair of ports $n$ and $m$ which are in communication with two axial channels $n'$, $m'$ drilled in the output shaft.

The channel $m'$ is in communication with the fluid pressure supply to the fluid operated clutch and the channel $n'$ is connected to a pressure relief outlet.

The fluid transfer port (or ports) $e$ in the outer ring $b$ is normally angularly displaced by an angle from the port (or ports) $n$ in the inner ring $c$ which is connected to the pressure relief outlet, but when the torque exceeds a predetermined value the relative angular displacement of the driving and driven members of the coupling due to distortion of resilient material $l$ brings the transfer port (or ports) $e$ into a position to register with the pair (or pairs) of ports $n$, $m$ in the inner ring $c$, thus relieving the clutch (not shown) of fluid pressure and causing it to disengage.

When the torque again falls below the predetermined value the clutch is reengaged as the parts return to their original positions.

It will be understood that the invention is not restricted to the details of the specific embodiment described which may be varied without departing from the scope of the following claims.

I claim:

1. A flexible coupling of the kind comprising driving and driven members interconnected by resilient material to driving and driven shafts respectively and including pressure fluid clutch release means, at least one pair of angularly displaced radial ports in an annular ring fitted to said driven shaft, one of each pair of radial ports communicating with one of a pair of axial passages in said driven shaft which are connectible to a fluid pressure clutch operator, and an annular ring fitted to said driving member and having at least one transfer port by which said radial ports are interconnected to release fluid pressure from the clutch operator on a predetermined flexure of said resilient material.

2. A flexible coupling according to claim 1 wherein interconnection of the radial ports is terminated when flexure of said resilient material is less than the predetermined amount, whereby fluid pressure may be restored to the clutch operator.

References Cited in the file of this patent
UNITED STATES PATENTS

| | | |
|---|---|---|
| 2,277,554 | McCoy | Mar. 24, 1942 |
| 2,476,632 | Shaff | July 19, 1949 |
| 2,642,971 | Hagenbook | June 23, 1953 |
| 2,709,903 | Hallewell | June 7, 1955 |